US007952608B2

(12) United States Patent
Thompson

(10) Patent No.: US 7,952,608 B2
(45) Date of Patent: May 31, 2011

(54) SURVEILLANCE DEVICE

(75) Inventor: Stuart Thompson, Erith (GB)

(73) Assignee: WQS Ltd., Isle of Man (GB)

( * ) Notice: Subject to any disclaimer, the term of this patent is extended or adjusted under 35 U.S.C. 154(b) by 1370 days.

(21) Appl. No.: 10/533,974

(22) PCT Filed: Oct. 30, 2003

(86) PCT No.: PCT/GB03/04691

§ 371 (c)(1), (2), (4) Date: Jan. 27, 2006

(87) PCT Pub. No.: WO2004/042667

PCT Pub. Date: May 21, 2004

(65) Prior Publication Data

US 2007/0109407 A1 May 17, 2007

(30) Foreign Application Priority Data

Nov. 7, 2002 (GB) .................................. 0226002.4

(51) Int. Cl.
*H04N 7/18* (2006.01)

(52) U.S. Cl. ....................................................... 348/143

(58) Field of Classification Search .................. 348/151
See application file for complete search history.

(56) References Cited

U.S. PATENT DOCUMENTS

| | | | | |
|---|---|---|---|---|
| 5,473,368 | A * | 12/1995 | Hart | 348/155 |
| 5,497,188 | A * | 3/1996 | Kaye | 348/36 |
| 5,878,283 | A * | 3/1999 | House et al. | 396/6 |
| 6,215,519 | B1 | 4/2001 | Nayar et al. | |
| 6,337,683 | B1 * | 1/2002 | Gilbert et al. | 345/418 |
| 6,400,903 | B1 * | 6/2002 | Conoval | 396/56 |
| 6,686,952 | B1 * | 2/2004 | Brazier | 348/143 |
| 2002/0004390 | A1 * | 1/2002 | Cutaia et al. | 455/424 |
| 2002/0030740 | A1 | 3/2002 | Arazi et al. | |
| 2004/0008253 | A1 * | 1/2004 | Monroe | 348/143 |

OTHER PUBLICATIONS

Fettke et al., "Comparison of Background Models for Video Surveillance", DICTA2002, pp. 1-6, Jan 2002.*

* cited by examiner

*Primary Examiner* — Andy S. Rao
*Assistant Examiner* — Hee-Yong Kim
(74) *Attorney, Agent, or Firm* — Arent Fox LLP

(57) ABSTRACT

A surveillance device has a support secured to a structure, a first image collection device secured to the support, a second image collection device and a servo motor, the second image collection device being moveable with respect to the support by the servo motor, the second image collection device having an optical axis whereby the servo motor is constructed and arranged to regulate the direction of the optical axis of the second image collection device. Inherent intelligence in the device or in a remote computer is used to direct the servo motor in accordance with algorithms recognizing and analyzing motion in the area being monitored by first image collection device.

25 Claims, 4 Drawing Sheets

SURVEILLANCE DEVICE

RELATED APPLICATIONS

This application is the U.S. National Stage of International Application No. PCT/GB2003/004691, filed Oct. 30, 2003, published in English, and claims priority under 35 U.S.C. §119 or 365 to Great Britain Application No. 0226002.4, filed Nov. 7, 2002.

The present invention relates to a surveillance device, a surveillance structure, a surveillance system and a method of watching over an area.

Surveillance devices using imaging techniques are well known in the art. One prior art security device contains a camera for collecting image data, and a control device responsive to the collected data to cause the camera to track a moving subject. Typically the control device operates to cause the image collection device to pan and/or tilt so as to follow a subject falling within the field of view of the pick-up device. The control device includes a servo motor and a processing circuit that detects movement within an image and which provides control signals to the motor to turn the image pick-up device to follow the movement.

The known device uses circuitry which requires calibration and which is responsive to ageing and environmental effects. It is thus necessary to recalibrate the circuitry on a regular basis if the correct information is to be picked up. Another problem with the known device is that it is vulnerable to distraction. Since the device is primarily response to data within the current field of view, one subject can enter the field of view and retain the attention of the device by suitable movements while the activities of a second subject out of the field of view remain undetected.

It would be advantageous to provide a device embodiments of which would be capable of avoiding the above-mentioned difficulties.

According to a first aspect of the present invention there is provided a surveillance device comprising a support constructed and arranged to be secured to a structure, a first image collection device secured to the support, a second image collection device and a servo motor, the second image collection device being moveable with respect to the support by the servo motor, the second image collection device having an optical axis whereby the servo motor is constructed and arranged to regulate the direction of the optical axis of the second image collection device.

The first image collection device may comprise plural camera devices.

In an embodiment, the first image collection device is fixed to the support in use and is constructed and arranged permanently to monitor a scene. Data collected from the first image collection device are processed and used to control the servo motor when an event is detected. In embodiments where a high speed servo motor is provided, the second image collection device can respond to more than one event of interest detected by the first image collection device, the response being to cycle between the detected events.

The device may comprise a processor having a first port connected to receive data representatives of images collected by the first and second image collection devices, the second port connected to the servo motor for control thereof and a third port connected to a data input/output interface device.

Where the device operates using only digital signals, the need for recalibration can be entirely or substantially avoided.

In one embodiment, the first and second image collection devices each include respective embedded processing circuitry, each embedded processing circuitry being connected to communicate with the first port of the processor device.

In one embodiment the processor device is operable to monitor data received from the embedded processing device of the first image collection device and, in respect thereto, to supply commands to the servo motor via the second port.

In another embodiment, the processor device converts data from the first and second image collection devices using a communications protocol into a pulse stream for output at the third port.

The second image collection device may have a zoom input, and a field of view be variable in dependence on a control signal at the zoom input The second image collection device may have a tilt input, and a field of view be variable in dependence on a control signal at the tilt input According to a second aspect of the present invention there is provided a surveillance system comprising the surveillance device in accordance with the first aspect and a computer remote from the surveillance device, the system further comprising a communications device interconnecting the surveillance device and the remote computer.

In one embodiment the communications device comprises an Ethernet cable. In another embodiment the communications device comprises a wireless communication system.

In one embodiment the wireless communication system comprises a radio channel.

In one embodiment, the wireless communication system comprises a wireless LAN or "WiFi".

According to a third aspect of the invention there is provided a method of automatically watching over an area without operator supervision using a surveillance device having a first spatially fixed image collection device and a second image collection device having a movable field of view, the device having an output for image data, the method comprising using the first image collection device to observe the area to detect movement; upon detection of movement, transferring signals from the first image collection device to the output, said signals representative of an image of at least a location where said movement takes place, and controlling the field of view of the second image collection device to observe the location where said movement takes place, and, transferring signals from said second image collection device, said signals being representative of an image of said location where said movement takes place at least while said movement is detected.

According to a fourth aspect of the invention there is provided a surveillance device having plural spatially fixed camera devices, each spatially fixed camera device having a fixed field of view, at least one further camera device, the at least one further camera device having a field of view movable in space, and processing circuitry operable in response to signals from at least one of said plural spatially fixed camera devices to cause the field of view of the at least one further camera device to include a given area.

According to a fifth aspect of the invention there is provided a surveillance structure comprising a support having plural socket devices secured thereto each for receiving a respective camera and at least one further socket device for receiving a first camera, the or each further socket device being coupled to the support via a motor drive constructed and arranged to move the further socket device in rotation about the support, the surveillance device further comprising a respective electrical connector device for each socket device and further socket device, a further electrical connection device for receiving a device for communicating with said socket devices and further socket devices, and communication network circuitry interconnecting said electrical connector devices.

Further circuitry may connect the further electrical connection device to the motor drive.

The device for communicating with said socket devices and further socket devices may comprise an intelligent hub device.

An advantage of this structure is that it can be embodied as a "one size suits all" structure in which only those sockets needed for the area being scrutinised are in fact occupied by fixed reference cameras. The structure can be such that cameras can simply be manually plugged in to the electrical connections and the structure then supports the cameras. The electrical communication network may be self configuring with a "plug and play" type of set-up to cope with different numbers and locations of cameras.

In embodiments, the controlling feature is provided predictively, whereby previous locations of motion of an object of interest are used to determine where to aim the movable camera.

In embodiments, there is provided an "auto-ignore" feature to account for movement of features such as trees and plants, so that the moving camera is not sent to examine areas of no interest. The auto ignore may allow the movable camera to move to view an area for example only where the speed of movement is above a set or variable threshold, or where the object is above a given number of pixels in size for a particular zoom, or where speed is below a threshold, or where the size is below a set threshold. Locking onto a target may only occur when one or more of these conditions pertains.

After information is picked up by the camera the information may be presented to a viewer, e.g. via a transmission network such as a wireless LAN, or may be archived onto a storage medium.

Exemplary embodiments of the invention will now be described with reference to the accompanying drawings in which.

Figure 1:
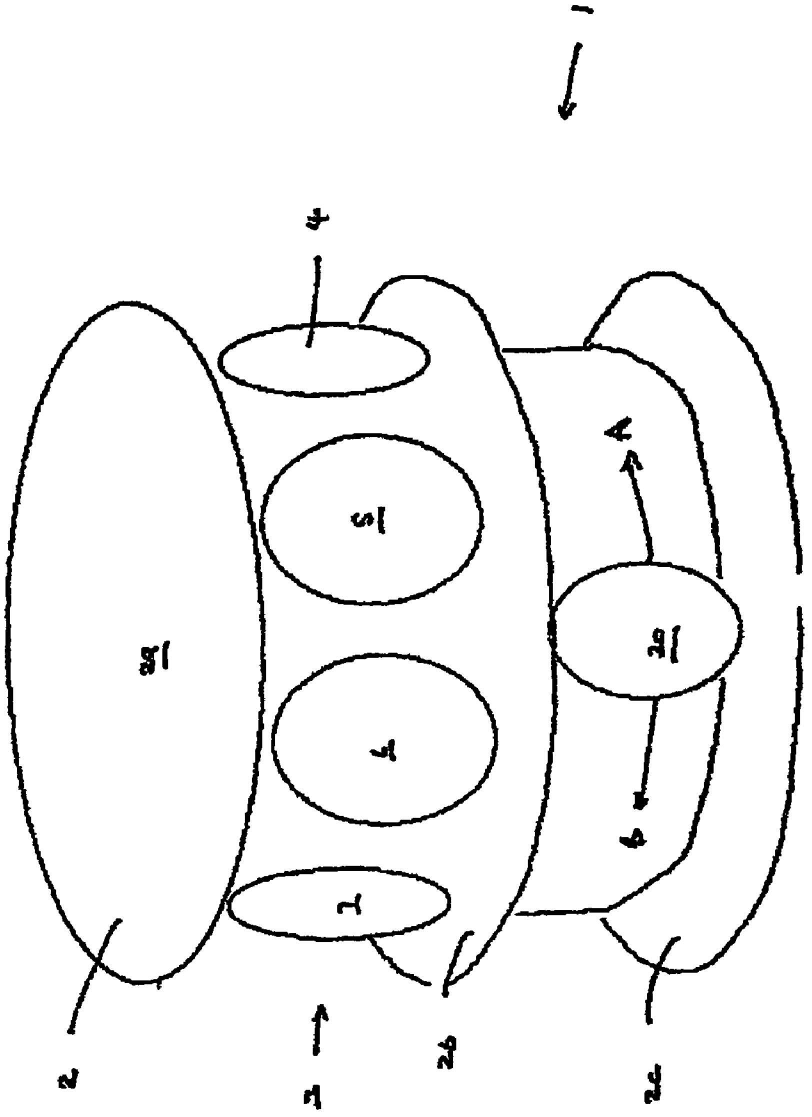
FIG. 1 shows a schematic perspective view of a surveillance device embodying the invention.

Referring to FIG. 1 a surveillance device 1 has a support 2 which is constructed and arranged to be secured to a structure, for example to a support pole or to a bracket secured to a building. The support of this embodiment includes three spaced generally circular plates 2*a*, 2*b*, 2*c*. A first image collection device 3 here consists of a discrete digital camera devices 4-11 (8-11 not visible in the drawing) disposed circumferentially about the support 2 with each digital camera device providing a 48 degree field of view. The first image collection device is disposed between the first and second plates 2*a*, 2*b*. The presently described embodiment provides 360 degree vision, the field of vision of the cameras providing a small degree of mutual overlap. In other embodiments, fewer cameras will be provided. For example if the surveillance device is secured to a building, it may be necessary to provide only 180 degrees of vision, in which case only four cameras need be provided, or 90 degrees in which case only two cameras are needed.

The surveillance device 1 further includes a second image collection device 20 here disposed under the first image collection device 3, and between the second and third plates 2*b*, 2*c*. The second image collection device 20 is likewise a digital camera having a 48 degree field of view, the camera 20 being capable of pan, tilt and zoom action. The tilt and zoom functions may be provided digitally for example by known image processing techniques, or may be by physical movements of components within the camera or of the camera 30 itself. The pan function is provided by a servo motor (75, see FIG. 2) which drives the camera 20 around the support as shown by arrows A and B in FIG. 1. As the present embodiment relates to a surveillance device capable of 360 degree surveillance, the camera 20 is capable of 360 degree rotation about the support 2. Where less than 360 degree vision is required, the camera 20 may be limited in movement, either physically or by virtue of a control program.

Although the present embodiment only shows a single camera 20, it would be possible to provide further cameras similar to the camera 20 and each capable of mutually independent pan, tilt and zoom where a high traffic is expected. The servo motor 75 is selected together with the weight of the camera 20 to allow rapid panning of the camera so as to allow the camera to switch between different detected events.

Figure 2:
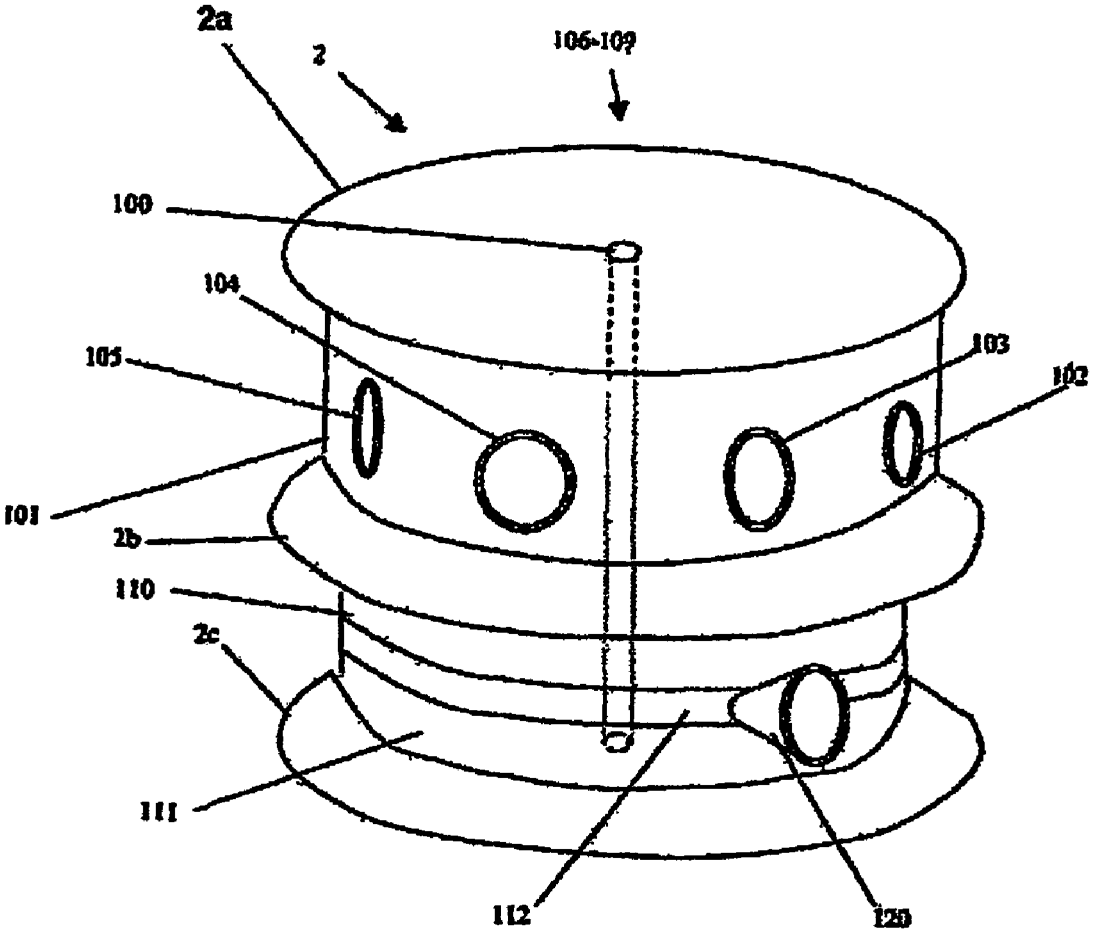
FIG. 2 shows a view similar to that of FIG. 1 with cameras removed.

A support 2 embodying the invention is shown in FIG. 2, with the cameras removed. The first, second and third circular plates 2*a*, 2*b*, 2*c* are spaced apart along a central column 100 along the axes of the plates. A cylindrical wall 101 is disposed between the first and second plates 2*a*, 2*b*. The wall 101 defines eight identical sockets 102-109 (four only visible) disposed regularly around its periphery. The sockets 102-109 afford housings for cameras 4-11, which can be mounted to the support by insertion into the sockets. The support contains electrical circuitry with connectors in each socket to allow communication and control, as will later be described with respect to FIG. 3. In the present embodiment, the support as delivered includes removable blanking plates covering each socket. The blanking plates are removed and cameras in the number needed for the application are inserted into the selected sockets.

Continuing to refer to FIG. 2, a second cylindrical wall 100, extends downwardly from the second plate 2*b* and a third cylindrical wall 111 extends from the third plate 2*c*, the cylindrical walls 110, 111 leaving between them a slot 112 of constant width. A camera mount 120 extends through the slot 112, and is driven in rotation about the column 100 by means of the servo motor 75 (not visible). The camera mount 120 includes an electrical connector for a camera and, similarly to the sockets 102-109 acts to support a manually-inserted camera. As noted above, the device 2 can be extended by addition of further movable cameras by adding a further circular plate with slot-providing cylindrical walls.

In the described embodiment, a dome covers the support and provides weather-proofing in use. Where no dome is provided, the removable covers may provide weather-proofing and the slot 112 may have a gasket arrangement.

Figure 3:
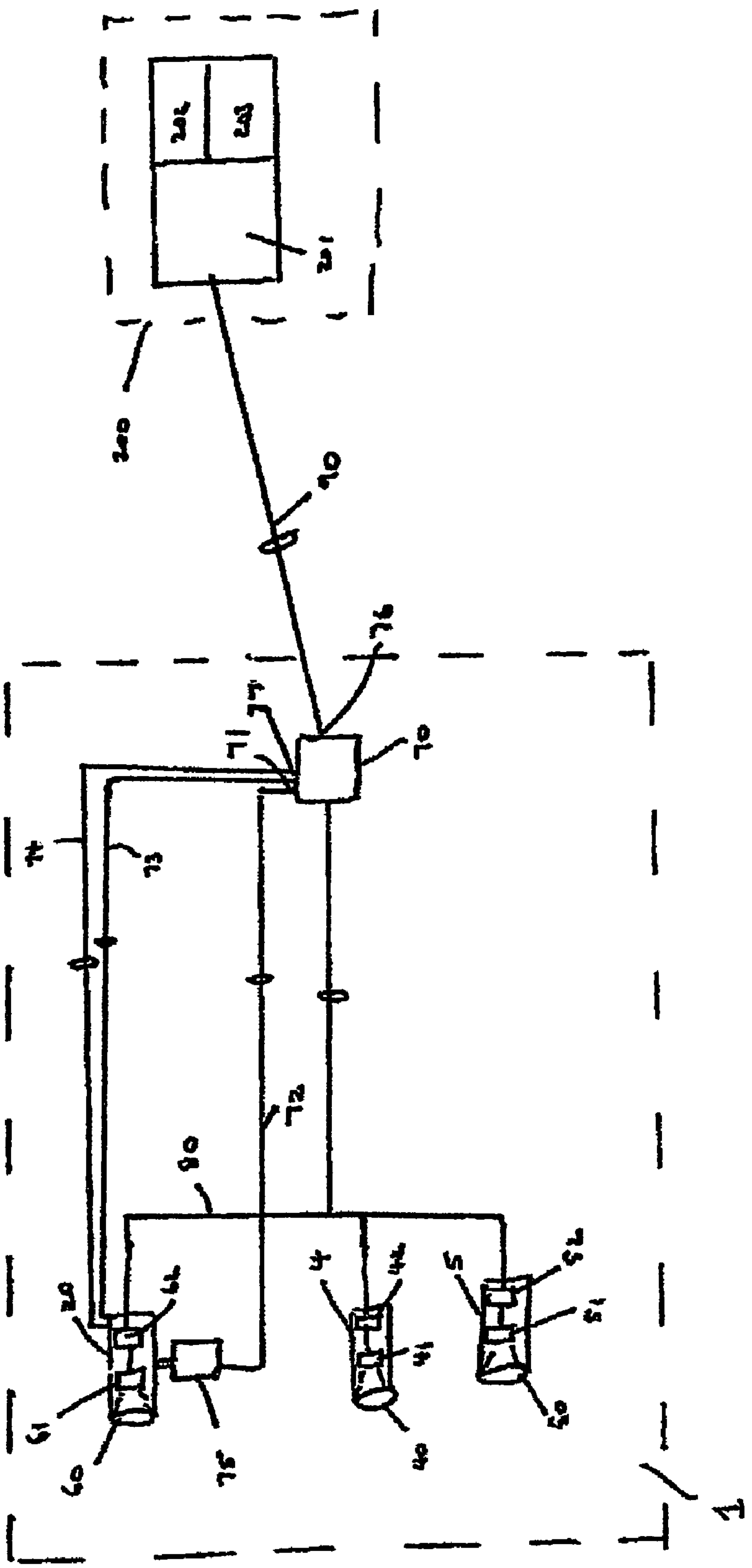
FIG. 3 shows a block schematic representation of a surveillance system embodying the present invention.

In FIG. 3 an embodiment having only a first image collection device with only two digital cameras 4, 5 and a single camera 20 forming the second image collection device is shown. Each of the cameras 4, 5 consists of a respective lens 40, 50, a respective image pick-up device 41, 51, for example a CCD pick-up, and respective embedded processing circuitry 42, 52. The embedded processing circuitry 42, 52 includes on-chip memory storing instructions necessary for operation of the processing circuitry. Each of the digital cameras 4, 5 has additionally embedded processing circuitry 42, 52 connected via a LAN connection 80 which enables the image collection devices to output collected data The LAN 80 extends to an intelligent hub device 70 which receives information from each of the image pick-up devices 4, 5.

In the present embodiment, each device on the LAN has its own time slot and communication is thus cyclic. Other techniques can be substituted for this—for example, there may be a priority allotted to some devices, or a token ring communication protocol can be used. The way the LAN communicates may be chosen according to the system architecture—for example in embodiments where the intelligence is well-distributed regular communication may be less essential than in embodiments where centralised control is provided.

The camera 20, similarly to the cameras 4, 5 also includes a lens 60, an image pick-up 61 and embedded processing circuitry 62. The camera 20 is controlled in rotation about the support 2 by the servo motor 75, which is connected to, and controlled from, an output port 71 of the hub device 70 via a bus connection 72. The camera 20 also receives signals from a control bus 73, 74, here shown as two separate buses for clarity so as to effect the zoom and tilt of the camera 20. In this embodiment, the bus 73 controls a digital zoom feature of the camera and the bus 74 controls a digital tilt feature. However, it would alternatively be possible to provide a moving zoom leans and a second servo motor to physically tilt the camera 20 if preferred. The buses 73 and 74 connect to a further port 76 of the hub 70.

The hub further has a data input/output interface port 76, which connects here via an Ethernet link 90 to a remote computer 200. The remote computer 200 includes a processor 201 running a program shown symbolically as block 202 and is connected to a store device such as hard disk 203 to store information on the hard disk, the information being derived from that provided over the Ethernet link 90.

In other embodiments, the Ethernet link 90 is replaced or supplemented by a wireless data link, or by another wired bus system, for example a USB. In these cases an interface device will be required between the surveillance device 1 and the communication channel and the communication channel and the computer 200.

In operation, the cameras 4, 5 monitor a 90 degree angle. The hub 70 operates the LAN 80 on a clocked basis and cyclically connects between the pick-up devices 4, 5. The embedded processing circuitry 42, 52 in the described embodiment includes firmware as previously discussed, for image analysis so that data output to the LAN 80 consist only of significant information. That is to say, the imaging output over the LAN 80 is compressed image data rather than raw data, for example such that the data represents only motion data. The processing circuitry 42, 52 converts the data into the correct form for the LAN, eg to IP data. The firmware may also carry out supervisory and control functions, for example adjusting operation for varying light conditions.

In other embodiments the processing circuitry 42, 52 does not run such firmware and merely acts to convert the data received from the CCD devices 41, 51 into the correct protocol for the LAN 80.

Again in the present embodiment, the intelligent hub 70 acts a server to the LAN with the cameras 4, 5, 20 acting as clients. The hub is programmed to respond to data on the LAN 80 indicative of movement in the area under observation and in response thereto controls the servo motor 105 and the tilt and zoom buses 73, 74 to cause the camera 20 to home in on the movement. In this embodiment the hub 70 is programmed to assess the size of the moving subject by assessing the size of the moving subject in terms of pixels and the amount of zoom currently applied. The device may be programmed to ignore subjects of less than a threshold size, so as to disregard moving leaves, birds and the like.

However, in other embodiments, all moving subjects may be tracked by the camera 20.

The hub 70, in any event, converts the incoming data from the LAN 80 to the relevant format for the communication link 90, so that all movement data is provided to the compute 200. In the computer 200, the data are provided to the processor 201 and processed by the software 202. The data are then stored on the hard drive 203. The hard drive is written to in a recirculating form so that once the hard drive reaches a given state of fullness, rewriting starts at the earliest entry.

Although the present embodiment has been described as having substantial intelligence built into the surveillance device 1, specifically the computer 200 could represent the intelligence in the system, and the processing devices in the image pick-up devices, the camera and the hub could merely reformat data.

It is fundamental to the preferred embodiments that no human control or supervision is needed to direct the operation of the device, at least once set up. The software of the system is, in these preferred embodiments, capable of assessing the activity in a scene being monitored and to direct the relevant image pick-up device(s) to zoom, pan and tilt appropriately to input visual data likely to be of interest. Such data may be archived, presented for viewing or, if so desired, cause an alarm to be sounded.

It would alternatively be possible to provide all of the intelligence in the camera itself and confine the functionality of the computer 200 to recording data.

Power may be provided for the device 1 from a mains power supply, by power over Ethernet, by the use of photovoltaic cells, wind turbines or otherwise as known.

The presence of the two fixed cameras 4, 5 in the embodiment (more cameras in embodiments where a wider range of observation is needed) means that the area being observed is constantly under observation. The device is programmed to cause the moving camera 20 to shuttle between multiple moving subjects if these are in different zones of the area, and to forward image data of the activities of each subject for recording. Where a relatively busy area is being observed, plural moving cameras are provided, and each camera may be allotted particular subjects using an algorithm to increase observation efficiency. Hence if two cameras are provided and five subjects are moving, the device may divide the subjects by location to minimise camera movement, or zoom/tilt changes.

Although the described embodiment uses cameras with all associated circuitry on-board, camera costs may be reduced by providing the embedded processing circuitry 42, 52 as part of the support device itself, along with the LAN and hub. In other embodiments, the circuitry of the support includes only the LAN wiring, the intelligent hub, and sockets for cameras having their own on-board processing.

In an embodiment, the cameras are analogue PAL cameras. In another embodiment digital cameras are used. Where megapixel digital technology is employed electronic pan, tilt and zoom can be used within each reference camera as well as the mechanical pan, tilt and zoom (where available) to cover more simultaneous occurrences or events. This allows the mechanical pan, tilt and zoom to have a greater life expectancy.

The zoom level of the pan, tilt and zoom camera may be used in calculating the size of the moving object from the reference camera with a pre-determined desired zoom setting, this zoom level being termed "zoom factor" In some embodiments, the images captured from the moving camera are not used in controlling the pan, tilt or zoom mechanism, this control being exclusively from the reference cameras. In other embodiments, image data from the moving camera is used to determine pan, tilt and zoom instructions, for example for object tracking purposes When in an external environment the quality of a picture varies immensely due to noise. This may result in the image processing system momentarily losing its subject (say losing one or two frames). Coupled with this noise problem, shadows of a moving object also add to the processing burden where an object is moving. Thus the time that the system momentarily loses its subject may be the same time that the subject gains a shadow—this shadow could then momentarily become the only moving object in the scene and hence the only information available to predict where the object is moving towards.

The problems may be solved by using an algorithm, e.g. a least squares fit algorithm, to balance the centre of mass taking all the above into consideration so the camera smoothly follows the heaviest dense mass without darting off on each frame's prediction point. The algorithm may use a number of historical frames as well as a least squares fit algorithm to smooth the operation.

Figure 4:
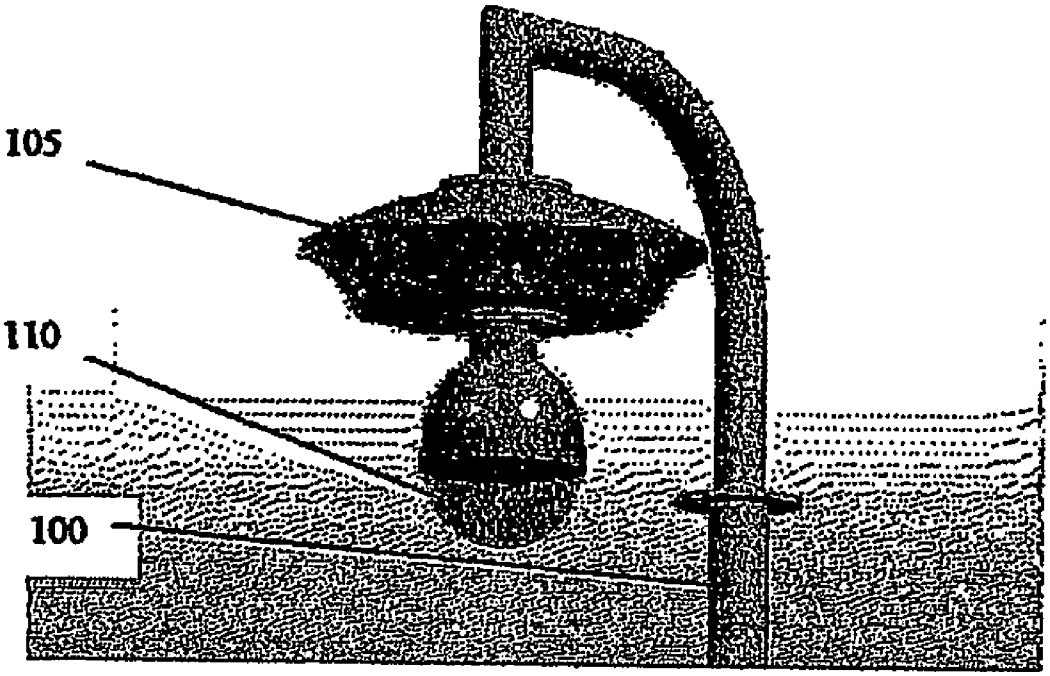
FIG. 4 shows another exemplary physical layout of a surveillance device embodying the invention.

FIG. 4 shows another embodiment of the surveillance device, having a support (100), a set of reference cameras (105) and a dome covering a moving camera (110).

Am embodiment of the present invention has been described with particular reference to the example illustrated. However, it will be appreciated that variations and modification may be made to the example described within the scope of the present invention.

The invention claimed is:

1. A surveillance device comprising:

a support having a top circular plate, a bottom circular plate and an intermediate circular plate, the top and bottom circular plates being axially spaced apart along a central column, the intermediate circular plate being disposed intermediate the top and bottom circular plates, the support further comprising a first cylindrical wall extending between the top cylindrical plate and the intermediate cylindrical plate, a second cylindrical wall extending downwardly from the intermediate circular plate and a third cylindrical wall extending upwardly from the bottom circular plate, the second cylindrical wall and the third cylindrical wall defining a slot of constant width therebetween, the support being constructed and arranged to be secured to a structure, a first image collection device secured to the first cylindrical wall, a second image collection device and a servo motor, the second image collection device being mounted below the first image collection device and being movable to and fro in the slot by the servo motor, the second image collection device having an optical axis whereby the servo motor is constructed and arranged to regulate the direction of the optical axis of the second image collection device;

wherein the first cylindrical wall comprises a plurality of mounting sockets for the first image collection device, the plurality of mounting sockets being disposed regularly and circumferentially around the first cylindrical wall, the first image collection device being thereby fixedly secured to the support.

2. The surveillance device of claim 1, wherein the first image collection device comprises plural camera devices, disposed to provide a substantially uninterrupted field of view.

3. The surveillance device of claim 2, wherein the first image collection device is fixed to the support in use and is constructed and arranged permanently to monitor a scene.

4. The surveillance device of claim 1, wherein the first image collection device is fixed to the support in use and is constructed and arranged permanently to monitor a scene.

5. The surveillance device of claim 1, wherein data collected from the first image collection device are processed to automatically detect an event such as motion, and the result of such detection used to automatically control the servo motor when an event is detected.

6. The surveillance device of claim 1, comprising a processor having a first port connected to receive data representatives of images collected by the first and second image collection devices, the second port connected to the servo motor for control thereof and a third port connected to a data input/output interface device.

7. The surveillance device of claim 6, wherein the processor converts data from the first and second image collection devices using a communications protocol into a pulse stream for output at the third port.

8. The surveillance device of claim 1, wherein the first and second image collection devices each include respective embedded processing circuitry, each embedded processing circuitry being connected to communicate with the first port of the processor device.

9. The surveillance device of claim 8, wherein the processor device is operable to monitor data received from the embedded processing device of the first image collection device and, in respect thereto, to supply commands to the servo motor via the second port.

10. The surveillance device of claim 1, wherein the second image collection device has a zoom input, and a field of view is variable in dependence on a control signal at the zoom input.

11. The surveillance device of claim 1, wherein the second image collection device has a tilt input and a field of view is variable in dependence on a control signal at the tilt input.

12. The surveillance device of claim 1, wherein a processor runs a predictive control algorithm whereby previous locations of motion of an object of interest are used to determine where to aim a movable camera.

13. The surveillance device of claim 1, having an "auto-ignore" feature to account for movement of features such as trees and plants, so that a moving camera is not sent to examine areas of no interest.

14. A surveillance device comprising a support having a top circular plate, a bottom circular plate and an intermediate circular plate, the top and bottom circular plates being axially spaced apart along a central column, the intermediate circular plate being disposed intermediate the top and bottom circular plates, the support further comprising a cylindrical wall extending between the top cylindrical plate and the intermediate cylindrical plate, having plural spatially fixed camera devices, each spatially fixed camera device having a fixed field of view, at least one further camera device is secured between the intermediate and bottom cylindrical plates below the first image collection device, the at least one further camera device having a field of view movable in space, and processing circuitry operable in response to signals from at least one said plural spatially fixed camera devices to cause the field of view of the at least one further camera device to include a given area;

wherein the cylindrical wall comprises a plurality of mounting sockets for the spatially fixed camera devices, the plurality of mounting sockets being disposed regularly and circumferentially around the cylindrical wall, the camera devices and the at least one further camera device being thereby fixedly secured to the support.

15. The surveillance device of claim 14, wherein a processor runs a predictive control algorithm whereby previous locations of motion of an object of interest are used to determine where to aim a movable camera.

16. The surveillance device of claim 14, having an "auto-ignore" feature to account for movement of features such as trees and plants, so that a moving camera is not sent to examine areas of no interest.

17. A surveillance structure comprising a support having a top circular plate, a bottom circular plate and an intermediate circular plate, the top and bottom circular plates being axially spaced apart along a central column, intermediate circular plate being disposed intermediate the top and bottom circular plates, the support further comprising a first cylindrical wall extending between the top cylindrical plate and the intermediate cylindrical plate, a second cylindrical wall extending downwardly from the intermediate circular plate and a third cylindrical wall extending from the bottom circular plate, the second cylindrical wall and the third cylindrical wall defining between them a slot of constant width, and having plural mounting sockets disposed regularly and circumferentially around the first cylindrical wall being thereby fixedly secured to the support and secured thereto each for receiving a respective camera and at least one further mounting socket below said plural mounting sockets for receiving a first camera, the at least one further mounting socket being coupled to the support via a motor drive constructed and arranged to move the at least one further mounting socket in rotation within the slot, the surveillance device further comprising a respective electrical connector device for each mounting socket and each of the at least one further mounting sockets, a further electrical connection device for receiving a device for communicating with said mounting sockets and each of the at least one further mounting sockets, and communication network circuitry interconnecting said electrical connector devices.

18. The surveillance structure of claim 17, wherein the device for communicating with said socket devices and further socket devices comprises an intelligent hub device.

19. The surveillance structure of claim 17, wherein a processor runs a predictive control algorithm whereby previous locations of motion of an object of interest are used to determine where to aim a movable camera.

20. The surveillance structure of claim 17, having an "auto-ignore" feature to account for movement of features such as trees and plants, so that a moving camera is not sent to examine areas of no interest.

21. A surveillance system comprising a surveillance device in combination with a computer remote from the surveillance device, the system further comprising a communications device interconnecting the surveillance device and the remote computer, wherein:

the surveillance device comprises a support having a top circular plate, a bottom circular plate and an intermediate circular plate, the top and bottom circular plates being axially spaced apart along a central column, the intermediate circular plate being disposed intermediate the top and bottom circular plates, the support further comprising a first cylindrical wall extending between the top cylindrical plate and the intermediate cylindrical plate, a second cylindrical wall extending downwardly from the intermediate circular plate and a third cylindrical wall extending upwardly from the bottom circular plate, the second cylindrical wall and the third cylindrical wall defining a slot of constant width therebetween, the support being constructed and arranged to be secured to a structure, the surveillance device further comprising a first image collection device secured to the first cylindrical wall, a second image collection device and a servo motor, the second image collection device being moveable to and fro in the slot below the first image collection device by the servo motor, the second image collection device having an optical axis whereby the servo motor is constructed and arranged to regulate the direction of the optical axis of the second image collection device; and wherein the first cylindrical wall comprises a plurality of mounting sockets for the first image collection device, the plurality of mounting sockets being disposed regularly and circumferentially around the first cylindrical wall, the first image collection device being thereby fixedly secured to the support.

22. The surveillance system of claim 21, wherein the communications device comprises one or more of an Ethernet cable and a wireless communication system.

23. The surveillance system of claim 21, wherein the communication device comprises a wireless communication system, the wireless communication system comprising at least one of a radio channel and a wireless LAN.

24. The surveillance system of claim 21, wherein a processor runs a predictive control algorithm whereby previous locations of motion of an object of interest are used to determine where to aim a movable camera.

25. The surveillance system of claim 21, having an "auto-ignore" feature to account for movement of features such as trees and plants, so that a moving camera is not sent to examine areas of no interest.

* * * * *